Sept. 14, 1926.　　　　　　　　　　　　　　　　1,599,883
H. L. GILCHRIST
METHOD AND APPARATUS FOR ADMINISTERING CHLORINE GAS AND THE LIKE
Filed March 19, 1924
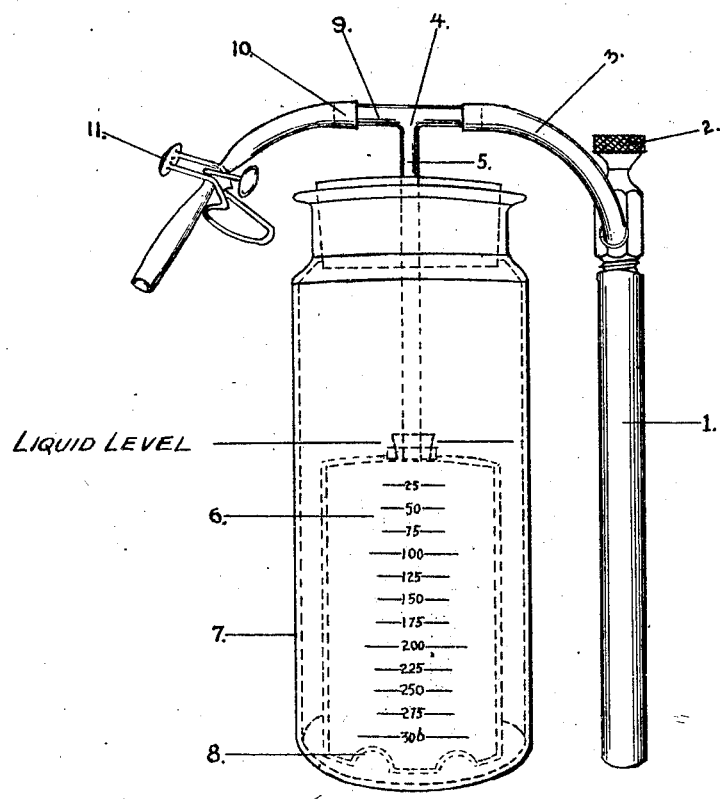
Inventor
Harry L. Gilchrist.
By Chas. Silver
Attorney Patented Sept. 14, 1926.

1,599,883

UNITED STATES PATENT OFFICE.

HARRY L. GILCHRIST, OF WASHINGTON, DISTRICT OF COLUMBIA.

METHOD AND APPARATUS FOR ADMINISTERING CHLORINE GAS AND THE LIKE.

Application filed March 19, 1924. Serial No. 700,244.

This invention relates to a method and apparatus for administering chlorine gas and the like and has more specific application to a process and apparatus for medicating atmospheric air by certain gases which, although toxic when administered in concentrated form, have been found to be very beneficial in the treatment of persons or animals suffering from respiratory diseases and ailments.

Among the objects of this invention is to provide a method and apparatus whereby a medicating gas, such as chlorine, may be conveniently and efficiently handled without danger to the operator or others in the vicinity where the operation is performed.

A further object of this invention is to provide a method and apparatus for dispensing the medicating gas so that the proper quantity of gas with which a given volume of air is to be treated may be readily measured and delivered into the atmosphere, the method and apparatus being such that high skill and technique is not required in carrying out the process.

Reference is to be had to the accompanying drawing wherein I have illustrated a preferred form of my apparatus.

This apparatus comprises a cylinder or drum (1) having a medicating gas, such as chlorine, under pressure, and this drum is provided with a suitable regulating valve (2), preferably operable by hand, for controlling the outflow of the chlorine from the drum. The chlorine passes from the drum (1) through the tube or conduit (3) to a T-tube (4), the stem (5) of said T-tube directly communicating with the interior of a graduated cylinder (6). This cylinder is disposed within a suitable vessel such as the jar (7), both the cylinder and jar being made preferably of glass. The mouth of the jar (7) is ordinarily of sufficient size to permit insertion and withdrawal of the cylinder (6) therefrom. The graduated cylinder (6) ordinarily rests upon the bottom of the jar (7), the cylinder being provided with suitable perforations (8) for permitting flow of liquid between the interior and exterior of the cylinder. This flow may also be accomplished by having the cylinder (6) supported at a distance from the bottom of the jar (7). Suitable means, such as rubber stoppers, are provided for effecting a tight connection between the tube (5) and cylinder (6) and for maintaining the tube (5) in proper position relative to the jar (7). If desired, however, the stem (5) may be shortened and connected by means of rubber tubing to a tube which is made integral with the cylinder (6) and communicates with the interior thereof.

I also provide the branch (9) of the T-tube (4) with a flexible hose or tube (10) and a pinch-cock (11).

In carrying out my invention, a suitable liquid which does not react in substantial proportion with the medicating gas and which does not absorb a substantial quantity of the medicating gas is placed within the jar (7), preferably so that the upper surface of the liquid will be above the zero graduation on the cylinder (6). When chlorine is employed as the medicating gas, I prefer to use a saline solution, for example a saturated solution of common salt.

The tube (10) is closed by the pinch-cock (11), and by turning the valve (2), the medicating gas is allowed to pass through the conduit (3), T-tube (4) and stem (5) to the cylinder (6) until the desired volume of liquid has been displaced from the cylinder (6), as may readily be observed by the graduations upon the cylinder. It is desirable to conduct the medicating gas gently into the cylinder (6), and thereby avoid bubbling and passage of the gas through the liquid. The valve (2) is now closed, and by opening the pinch-cock (11) the hydrostatic pressure of the liquid will force the medicating gas out of the cylinder (6) through the tube (5), branch (9) of the T-tube and tube (10) into the atmosphere. When the desired volume of gas has passed out of the cylinder (6) the pinch-cock (11) is closed.

In medicating the air within a room, it is desired to have all windows, doors and crevices closed or sealed. Also, in order to obtain uniform distribution of the chlorine or other medicating gas, the air should be agitated either by means of a fan or other suitable agitator.

In the claims the term "air" is used to include not only ordinary pure air, but air which has been modified or contaminated through various agencies or otherwise changed by atmospheric influences or disturbances.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:—

1. In an apparatus for supplying measured quantities of medicating gas to the atmospheric air, a container for medicating gas under pressure, a vessel adapted to hold liquid, a measuring cylinder disposed within said vessel, said cylinder having an opening near the lower portion thereof to permit flow of liquid between said cylinder and said vessel, a conduit from said container to the interior of said cylinder and means for conducting gas issuing from the measuring cylinder to the atmosphere.

2. In an apparatus for supplying measured quantities of medicating gas to the atmospheric air, a container for medicating gas under pressure, a vessel adapted to hold liquid, a measuring cylinder disposed within said vessel, said cylinder having an opening near the lower portion thereof to permit flow of liquid between said cylinder and said vessel, a conduit from said container to the interior of said cylinder, means for conducting gas issuing from the measuring cylinder to the atmosphere, means for regulating the flow of gas from said container to said cylinder and means for regulating the flow of gas from said cylinder to the atmosphere.

3. In an apparatus for supplying measured quantities of medicating gas to the atmospheric air, a container of medicating gas under pressure, a vessel containing a liquid which neither absorbs nor reacts with substantial quantities of said medicating gas, a measuring cylinder disposed within said vessel, said cylinder having openings near the lower portion thereof to permit flow of liquid between said cylinder and said vessel, a conduit from said container to the interior of said cylinder, means for conducting gas issuing from the measuring cylinder to the atmosphere, means for regulating the flow of gas from said container to said cylinder and means for regulating the flow of gas from said cylinder to the atmosphere.

4. In an apparatus for supplying measured suantities of chlorine gas to the atmospheric air, a container of chlorine under pressure, a vessel containing a saline solution which neither absorbs nor reacts with substantial quantities of chlorine, a measuring cylinder disposed within said vessel, said cylinder having openings near the lower portion thereof to permit flow of the saline solution between said cylinder and said vessel, a conduit from said container to the interior of said cylinder, means for conducting chlorine issuing from the measuring cylinder to the atmosphere, means for regulating the flow of chlorine from said container to said cylinder and means for regulating the flow of chlorine from said cylinder to the atmosphere.

5. Apparatus for supplying measured quantities of medicating gas to the atmosphere including a high pressure container having a supply of gas therein, an intermediate container having a liquid therein, means for supplying gas from the high pressure container to the intermediate container and displacing the liquid thereby, and means for supplying gas from the intermediate container to the atmosphere.

6. Apparatus for supplying measured quantities of medicating gas to the atmosphere including a high pressure container having a supply of gas therein, an intermediate container having a liquid therein, means for supplying gas from the high pressure container to the intermediate container and displacing the liquid thereby, and means for supplying gas from the intermediate container to the atmosphere, the intermediate container being adapted to measure the quantity of gas discharged to the atmosphere.

7. Apparatus for supplying measured quantities of medicating gas to the air including a graduated container having a liquid therein, a source of medicating gas, means for supplying the gas to the container, means for receiving the displaced liquid, and means for opening the graduated container to the atmosphere whereby the displaced liquid will force a quantity of the gas into the atmosphere.

8. The method of supplying measured quantities of medicating gas from a high pressure container to the atmosphere which includes discharging the gas from the container to an intermediate container having a liquid therein, displacing liquid in the intermediate container with gas, and supplying the gas from the intermediate container to the atmosphere by displacing the gas in the container with liquid.

HARRY L. GILCHRIST.